(12) United States Patent
Iijima

(10) Patent No.: US 7,324,087 B2
(45) Date of Patent: Jan. 29, 2008

(54) REDUCED IMAGE PRODUCTION METHOD AND APPARATUS

(75) Inventor: Tadahiko Iijima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/901,498

(22) Filed: Jul. 28, 2004

(65) Prior Publication Data

US 2005/0028112 A1    Feb. 3, 2005

(30) Foreign Application Priority Data

Jul. 30, 2003    (JP)    ............................. 2003-203936

(51) Int. Cl.
*G09G 5/08*    (2006.01)
(52) U.S. Cl. ...................... 345/157; 345/163
(58) Field of Classification Search ........ 345/156–167, 345/169, 173, 174–176, 177; 178/18.01, 178/18.03

See application file for complete search history.

(56) References Cited

U.S. PATENT DOCUMENTS

| | | | | |
|---|---|---|---|---|
| 5,883,617 | A * | 3/1999 | Yoshikawa | 345/157 |
| 6,292,173 | B1 * | 9/2001 | Rambaldi et al. | 345/157 |
| 6,388,655 | B1 * | 5/2002 | Leung | 345/157 |
| 7,109,975 | B2 * | 9/2006 | Fedorak et al. | 345/173 |
| 7,148,875 | B2 * | 12/2006 | Rosenberg et al. | 345/156 |
| 2002/0047830 | A1 * | 4/2002 | Philipson | 345/157 |

FOREIGN PATENT DOCUMENTS

| | | |
|---|---|---|
| JP | 9-269869 A | 10/1997 |
| JP | 2001-117713 A | 4/2001 |

* cited by examiner

*Primary Examiner*—Richard Hjerpe
*Assistant Examiner*—Mansour M. Said
(74) *Attorney, Agent, or Firm*—Canon U.S.A. Inc., I.P. Division

(57) ABSTRACT

A method for controlling a cursor by moving the cursor in response to the operation of pointing device on a predetermined working area, wherein a predetermined proportion of the vector of the shift of the pointing device immediately before the movement of the pointing device is stopped is reflected in the movement of the cursor, when the pointing device is stopped and in contact with the working area.

12 Claims, 11 Drawing Sheets

INPUT ON TOUCH PAD                MOVEMENT OF CURSOR

FIG. 4
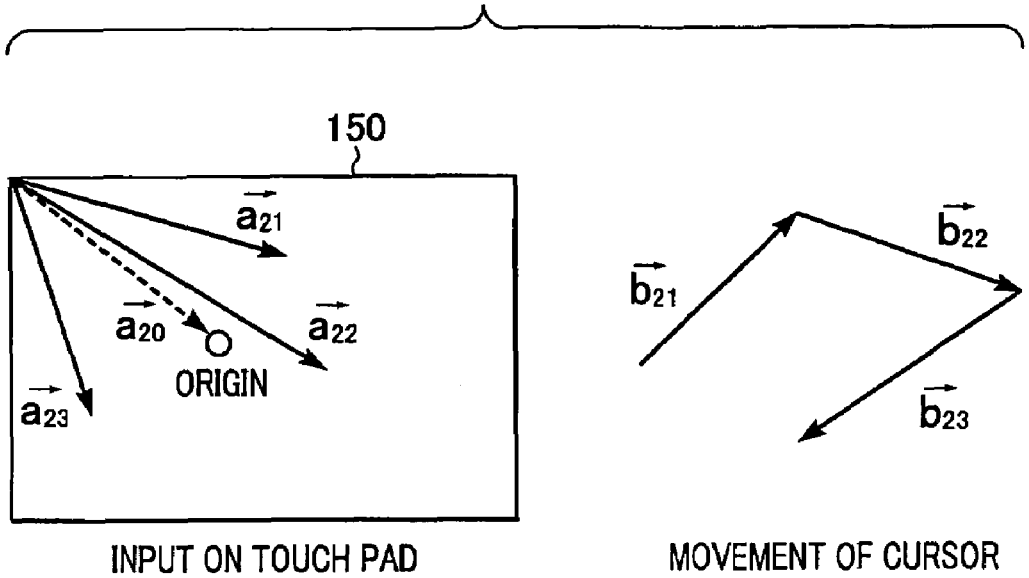
INPUT ON TOUCH PAD
MOVEMENT OF CURSOR
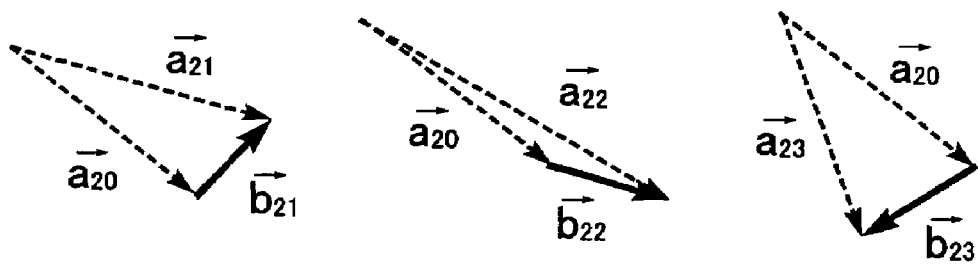
HOW TO OBTAIN $\vec{b}_{21}$, $\vec{b}_{22}$, AND $\vec{b}_{23}$

FIG. 10
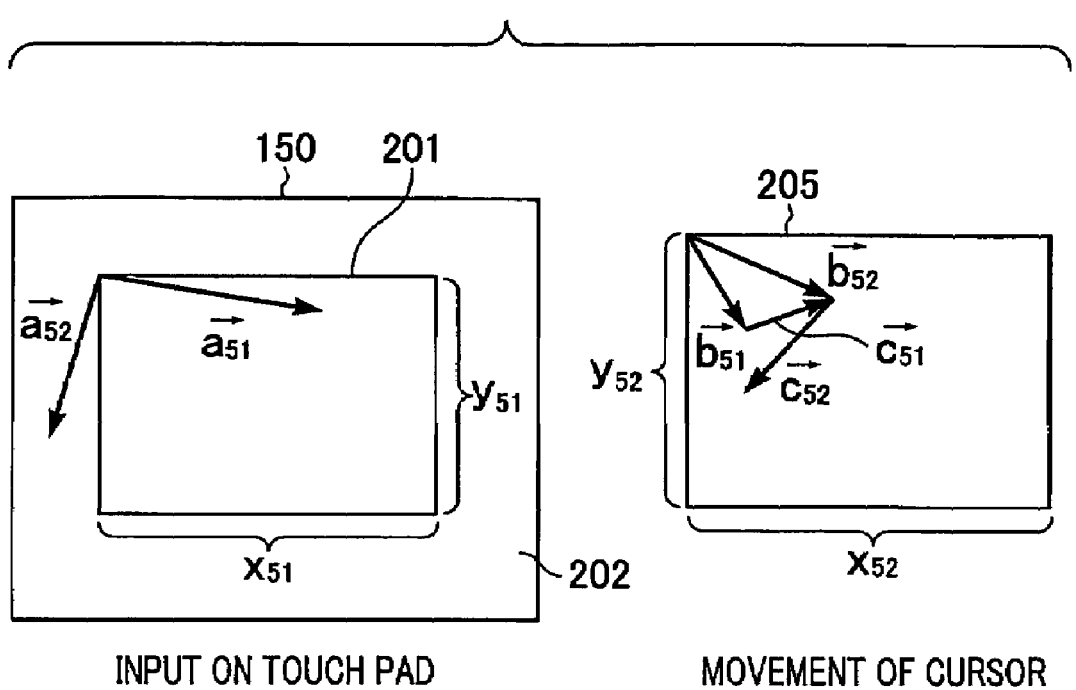
INPUT ON TOUCH PAD  MOVEMENT OF CURSOR
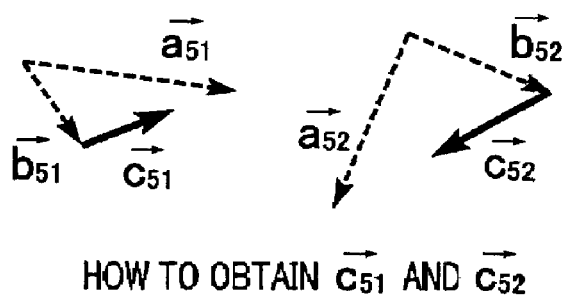
HOW TO OBTAIN $\vec{c_{51}}$ AND $\vec{c_{52}}$

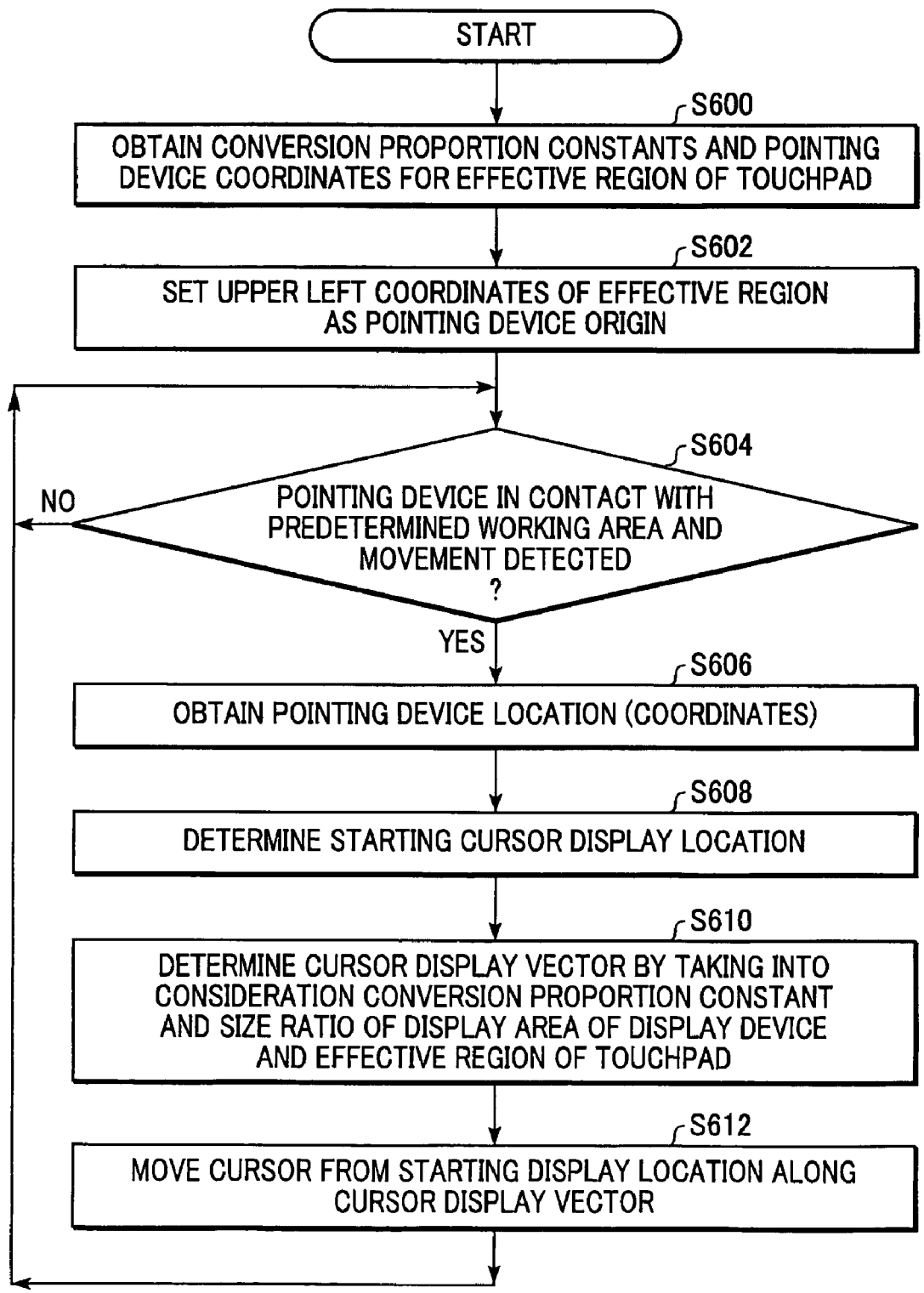

REDUCED IMAGE PRODUCTION METHOD AND APPARATUS

CROSS REFERENCE TO RELATED APPLICATIONS

This application claims priority from Japanese Patent Application No. 2003-203936 filed Jul. 30, 2003, which is hereby incorporated by reference herein.

BACKGROUND OF THE INVENTION

Field of the Invention

The present invention relates to a method for controlling the coordinates of a cursor by providing input to a predetermined working area.

A known method for controlling a cursor is a touch pad of a so-called notebook computer. For a touch pad having a small working area, the movement of the cursor is determined by the position that the input movement is stopped at the edge of the working area.

Japanese Patent Laid-Open No. 9-269869 discloses a known method for moving a cursor by adding the relative coordinates of each input movement on the touch pad, and, then, converting the computed results into the movement of the cursor. In addition, Japanese Patent Laid-Open No. 2001-117713 discloses a known method for switching the control of the movement of the cursor by a predetermined keystroke.

The size of the working area of a known touch pad depends on the type of the touch pad. A touch pad with a small working area takes up only a small area but controlling input for moving the cursor to a desired position is difficult. To compensate for this problem, the cursor may be moved relative to the input movement on the touch pad. However, to move the cursor a long distance, the input speed must be increased or the input movement on the touch pad must be repeated.

There is also a method for moving the cursor based on the position that the input movement is stopped at the edge of the small-sized working area of a touch pad. In this method, there is a problem in that the cursor does not continue to move unless the input movement reaches the edge of the working area. Moreover, there is a problem in that the cursor moves in a predetermined direction when the input movement reaches the edge of the working area, and, thus, the path of the input movement is not reflected in the movement of the cursor.

Furthermore, as described above, the control of the movement of the cursor may be switched by a predetermined keystroke. However, when switching the controlling method of the cursor by pressing a predetermined key, the controlling method is switched to a predetermined method. Thus, the method is limited to the predetermined method and the control of the movement of the cursor cannot be switched to another method that is more suitable for the given situation.

SUMMARY OF THE INVENTION

The present invention solves the above-mentioned problems. The magnitude of the input movement for moving a cursor when the coordinates of the cursor are specified by an input on a working area is decreased.

Furthermore, the method for controlling the cursor is appropriately switched based on the input movement on the working area.

According to an aspect of the present invention, a method is provided for controlling a cursor by moving the cursor in response to the operation of a pointing device on a predetermined working area. A predetermined proportion of the vector of the shift of the pointing device immediately before the movement of the pointing device is stopped is reflected in the movement of the cursor, when the pointing device is stopped and in contact with the working area.

According to another aspect of the present invention, a method for controlling the cursor is provided, wherein the reflection of the vector of the shift is continued while the pointing device is stopped and in contact with the working area.

According to still another aspect of the present invention, a method for controlling the cursor is provided, wherein the vector is not reflected in the movement of the cursor after the pointing device loses contact with the working area.

According to yet another aspect of the present invention, a method for controlling the cursor is provided, wherein when the pointing device is further shifted and in contact with the working area in a predetermined direction, the cursor is moved without reflection of the vector of the prior movement if the current movement satisfies a predetermined condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 illustrates the structure of a cursor controlling system according to an embodiment of the present invention.

FIG. 2 illustrates the relationship between the operation of a touch pad and the movement of a cursor according to a first embodiment.

FIG. 3 is a flow chart illustrating exemplary logic for moving a cursor based on the operation of a touch pad according to the first embodiment.

FIG. 4 illustrates the relationship between the operation of a touch pad and the movement of a cursor according to a second embodiment.

FIG. 5 is a flow chart illustrating exemplary logic for moving a cursor based on the operation of a touch pad according to the second embodiment.

FIG. 6 illustrates the relationship between the operation of a touch pad and the movement of a cursor according to a third embodiment.

FIG. 7 is a flow chart illustrating exemplary logic for moving a cursor based on the operation of a touch pad according to the third embodiment.

FIG. 8 illustrates the relationship between the operation of a touch pad and the movement of a cursor according to a fourth embodiment.

FIG. 9 is a flow chart illustrating exemplary logic for moving a cursor based on the operation of a touch pad according to the fourth embodiment.

FIG. 10 illustrates the relationship between the operation of a touch pad and the movement of a cursor according to a fifth embodiment.

FIG. 11 is a flow chart illustrating exemplary logic for moving a cursor based on the operation of a touch pad according to the fifth embodiment.

DESCRIPTION OF THE PREFERRED EMBODIMENTS

Exemplary embodiments are described in detail below in accordance with the accompanying drawings.

First Embodiment

Figure 1:
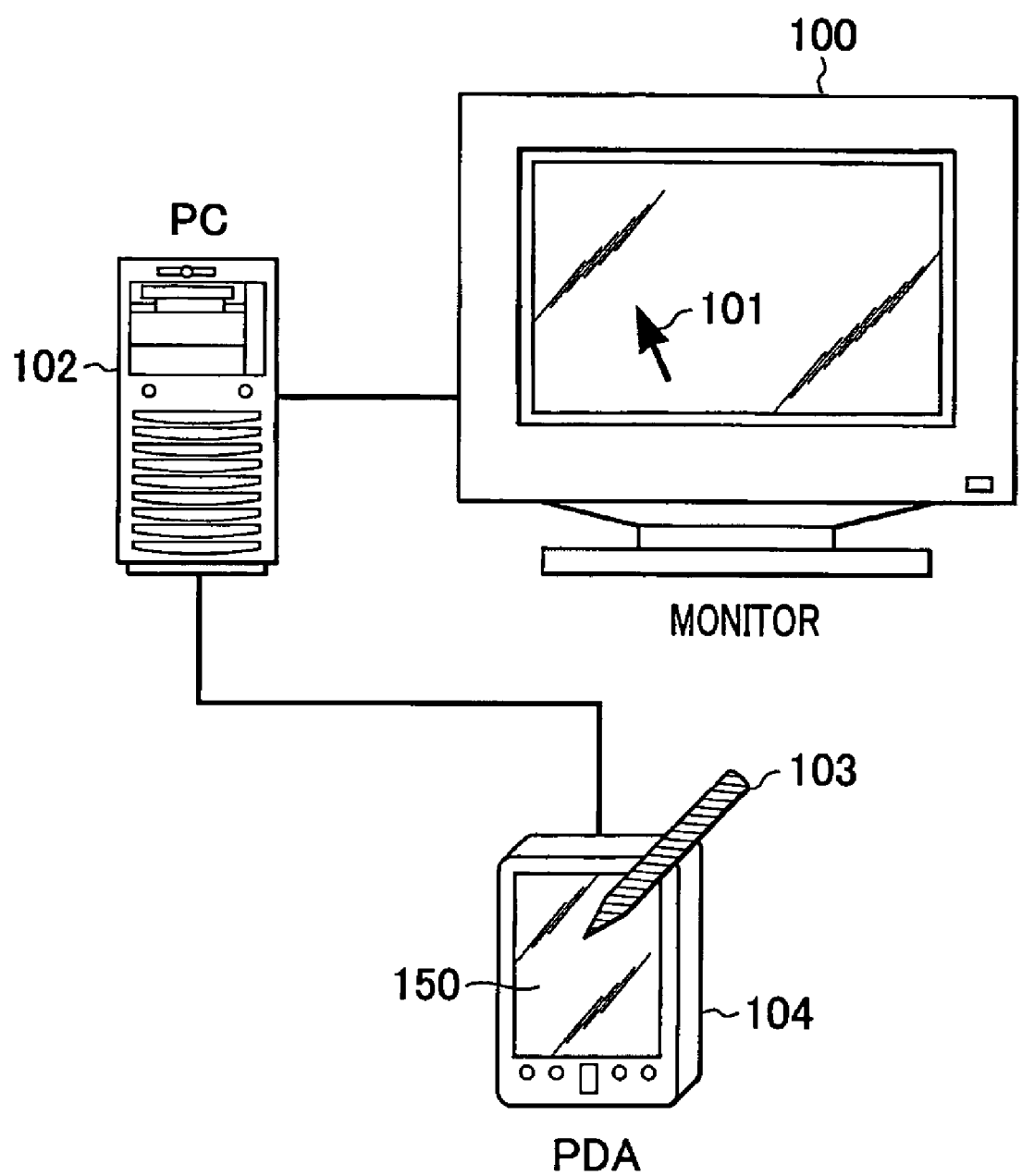

FIG. 1 illustrates the structure of a cursor controlling system according to a first embodiment. The system according to this embodiment includes a personal computer (PC) 102, a monitor 100 for displaying the output from the PC 102, and a personal digital assistant (PDA) 104 having a touch pad function connected the PC 102. Here, the 'touch pad function' refers to the function for moving a cursor 101 on the display of the PC 102. The PDA 104 includes a working area 150 for inputting the movement of the cursor 101. The movement is input using a stylus pen 103.

The touch pad function described in this embodiment may be achieved by other devices such as a digitizer or a tablet PC, which are capable of specifying the coordinates of the cursor 101 by skimming over a working area. The touch pad function may also be the touchpad of a computing device, such as a notebook (laptop) computer. In such a case, the touchpad function is operated with a user's finger rather than a stylus pen.

The movement of the cursor 101 is controlled by the shift of the stylus pen 103 in a moving mode on the surface of the working area 150 of the PDA 104, i.e., the touch pad. The shift of the stylus pen 103 is represented by a vector $\vec{a}_{11}$. Hereinafter, 'vector $\vec{a}_{xy}$' is simply referred to as '$\vec{a}_{xy}$.' When the stylus pen 103 is not moved but is in contact with the working area 150, i.e., when the stylus pen 103 is in a stop mode, the magnitude of the vectors $\vec{a}_{12}$ and $\vec{a}_{13}$ equal zero ($\vec{a}_{12} = \vec{a}_{13} = 0$).

Each vector $\vec{a}_{11}$, $\vec{a}_{12}$, or $\vec{a}_{13}$ of the shift of the stylus pen 103 on the working area 150 corresponds to vector $\vec{b}_{11}$, $\vec{b}_{12}$ or $\vec{b}_{13}$, respectively, of the cursor 101. In this embodiment, these vectors are controlled so that they satisfy the formulas below:

$$\vec{b}_{11} = k_1 * \vec{a}_{11}$$

$$\vec{b}_{12} = k_1 * \vec{a}_{11}$$

$$\vec{b}_{13} = k_1 * \vec{a}_{11}$$

(where, $k_1$ is a constant).

When the stylus pen 103 is in the stop mode, a predetermined proportion of the vector of the shift of the stylus pen 103 immediately before the stylus pen 103 is switched to the stop mode is reflected in the movement of the cursor 101.

When the stylus pen 103 is switched back to the moving mode, the cursor 101 moves so that the vector $\vec{b}_{1n}$ of the shift of the cursor 101 satisfies the formula below:

$$\vec{b}_{1n} = k_1 * \vec{a}_{1n}.$$

Figure 2:
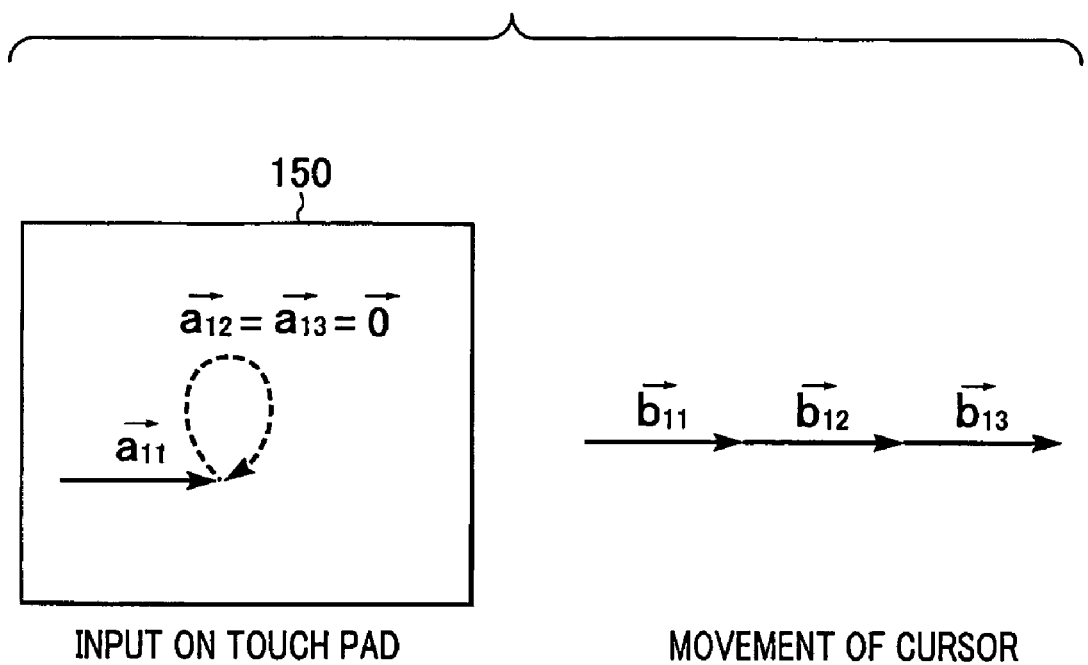

FIG. 2 illustrates the shift of the stylus pen 103 on the working area 150 of the PDA 104 according to this embodiment and the corresponding movement of the cursor 101 controlled in accordance with the movement of the stylus pen 103 in the moving mode and the stop mode. In FIG. 2, the dotted arrow in the working area 150 indicates that the stylus pen 103 is in the stop mode. According to FIG. 2, even when the stylus pen 103 is in the stop mode and is in contact with the surface of the working area 150, the cursor 101 continues to move according to the vector of the shift of the stylus pen 103 immediately before the stylus pen 103 is switched to the stop mode.

By controlling the cursor in this way, the cursor can be moved for a long distance without increasing the speed of the stylus pen 103 or moving the stylus pen 103 to the edge of the working area 150 on the touch pad (PDA 104).

By changing the constant $k_1$, the input by the stylus pen 103 on the working area 150 can be converted into the movement of the cursor in different proportions.

Figure 3:
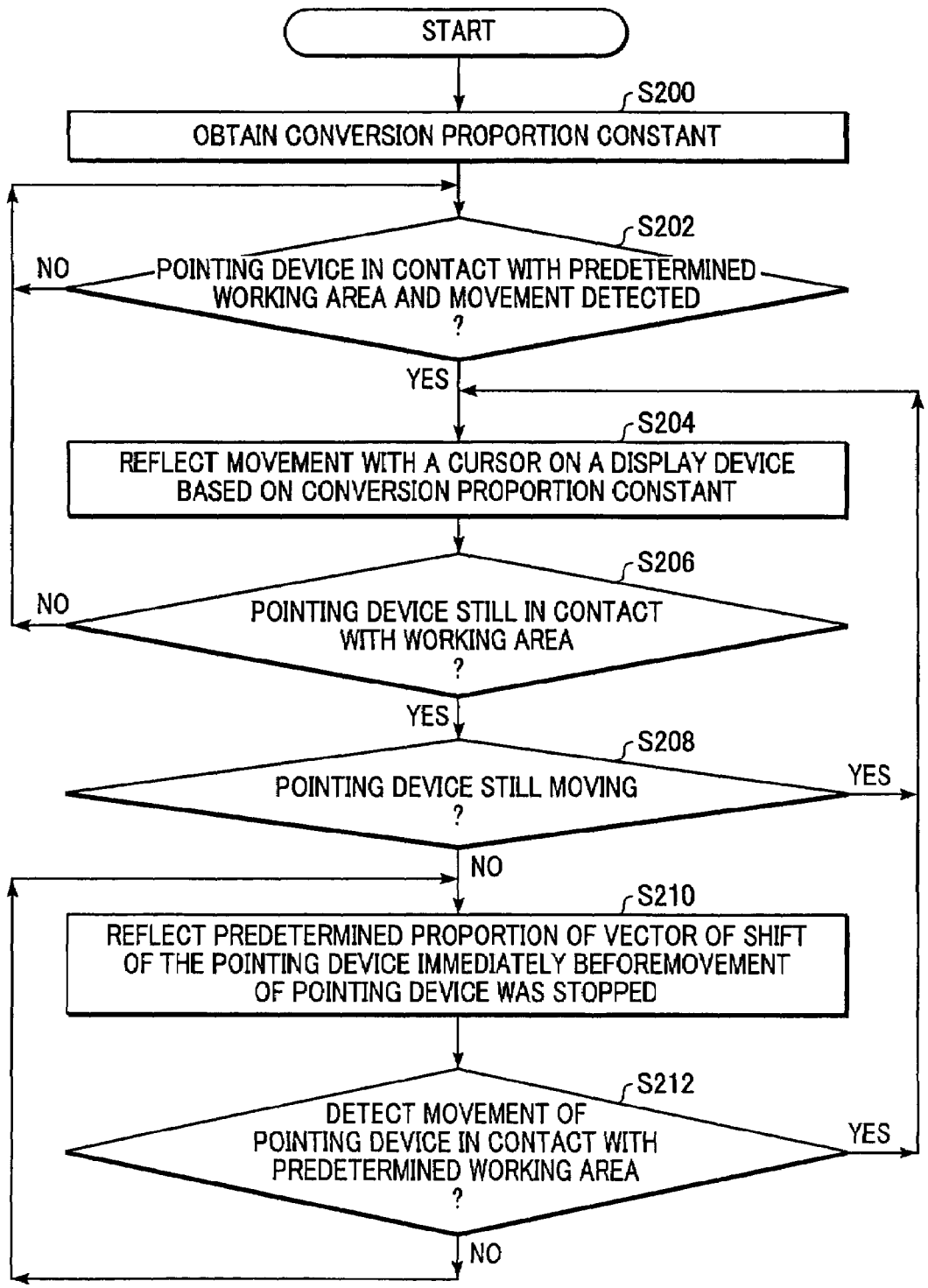

FIG. 3 is a flow chart illustrating exemplary logic for moving a cursor 101 on a display device 100 based on the operation of a touch pad 150 according to the first embodiment. The exemplary logic may be implemented in program code (software) that is executed by a computer, such as PC 102, in order to detect the operation of the touchpad, and display a cursor 101 on a display device, such as monitor 100.

In step S200, a conversion proportion constant ($k_1$) is obtained. A user places a pointing device, such as a stylus 103 in contact with a predetermined working area 150. The user moves the pointing device 103 while it is in contact with the working area 150. Such movement of the pointing device 103 while in contact with the predetermined working area 150 is detected in step S202. The detection of contact of the pointing device 103 with the working area 150 and movement of the pointing device 103 can be performed using any conventional technique, such as polling or interrupts. If a technique such as polling is used, and the pointing device is not in contact with the predetermined working area 150 or initial contact with the predetermined working area has been detected, but movement has not yet been detected, the logic returns to step S202 until the pointing device 103 is in contact with the predetermined working area 150 and movement of the pointing device 103 has been detected.

Once it has been determined in step S202 that the pointing device 103 is in contact with the predetermined working area 150 and movement of the pointing device 103 has been detected, the logic moves to step S204 where the movement of the pointing device 103 is reflected by movement of the cursor 101 on the display device 100. A location to display the cursor 101 on the display device 100 is determined based on the proportion constant obtained in step S200. The cursor 101 is moved to the determined location on the display device 100, for example, $\vec{b}_{11}$ of FIG. 2.

Next, at step S206, it is determined whether the pointing device 103 is still in contact with the working area 150. If the pointing device 103 is not still in contact with the working area 150, the logic returns to step S202 to wait for the pointing device 103 to regain contact with the predetermined working area 150 and for movement of the pointing device 103 to be detected.

On the other hand, if it is determined in step S206 that the pointing device 103 is still in contact with the working area 150, the logic proceeds to step S208 to determine if the pointing device 103 is still moving. If the pointing device 103 is still moving, the logic returns to step S204 to move the cursor 101 on the display 100 to reflect the continued movement of the pointing device 103.

If it is determined in step S208, that the pointing device 103 is not still moving (i.e., the pointing device 103 is in a stop mode where the pointing device 103 is not moving, but remains in contact with the predetermined working area 150), the logic proceeds to step S210 where reflection of the vector according to a vector shift immediately before entering the stop mode is displayed in movement of the cursor 101, for example as shown by $\vec{b_{12}}$ in FIG. 2. The logic then moves to step S212 to determine if movement of the pointing device 103 has resumed. If movement of the pointing device 103 has not resumed (i.e., the pointing device 103 is still in stop mode), the logic returns to step S210 to continue reflection of the cursor in stop mode, such as $\vec{b_{13}}$ shown in FIG. 2. If, however, movement of the pointing device 103 has resumed, the logic returns to step S204 to display reflection of the cursor in normal mode.

As described above, according to this embodiment, the movement of the stylus pen 103 can be reduced by effectively reflecting the vector of the shift of the stylus pen 103 immediately before the stylus pen 103 is switched to the stop mode in the movement of the cursor while being in the stop mode.

Second Embodiment

A second embodiment is described below.

In the method for controlling the cursor according to the second embodiment, an absolute coordinate $\vec{a_{20}}$ indicates the position where the stylus pen 103 first comes in contact with the working area 150 of the touch pad, i.e., the PDA 104. Absolute coordinates $\vec{a_{21}}, \vec{a_{22}}, \ldots, \vec{a_{2n}}$, indicate the positions the stylus pen 103 are moved to without losing contact with the working area 150.

In the second embodiment, the absolute coordinates $\vec{a_{20}}$, $\vec{a_{21}}, \ldots,$ and $\vec{a_{2n}}$ on the working area 150 correspond to vectors $\vec{b_{21}}, \vec{b_{22}}, \ldots,$ and $\vec{b_{2n}}$, respectively, which represent the shift of the cursor. In this embodiment, the vectors are controlled so that they satisfy the formula below:

$$\vec{b_{2n}} = k_2 * (\vec{a_{2n}} - \vec{a_{20}})$$

(where $k_2$ is a constant)

FIG. 4 illustrates the shift of the stylus pen 103 on the working area 150 of the PDA 104 according to the second embodiment and the corresponding movement of the cursor 101 controlled in accordance with the movement of the stylus pen 103 in the moving mode and the stop mode. In FIG. 4, the dotted arrows and the solid arrows in the working area 150 are vectors of the absolute coordinates of the stylus pen 103. The stylus pen 103 actually moves from an origin $\vec{a_{20}}$ to the positions $\vec{a_{21}}, \vec{a_{22}},$ and $\vec{a_{23}}$ in sequence without losing contact with the working area 150.

According to FIG. 4, the shift of the cursor 101 is obtained from the difference between the vectors of the current coordinates of the stylus pen 103 and $\vec{a_{20}}$. The cursor is moved in accordance with the shift of the stylus pen 103 while it is kept in contact with the working area 150 of the touch pad (PDA 104).

By changing the constant $k_2$, the input of the stylus pen 103 on the working area 150 can be converted into the movement of the cursor in different proportions.

Figure 5:
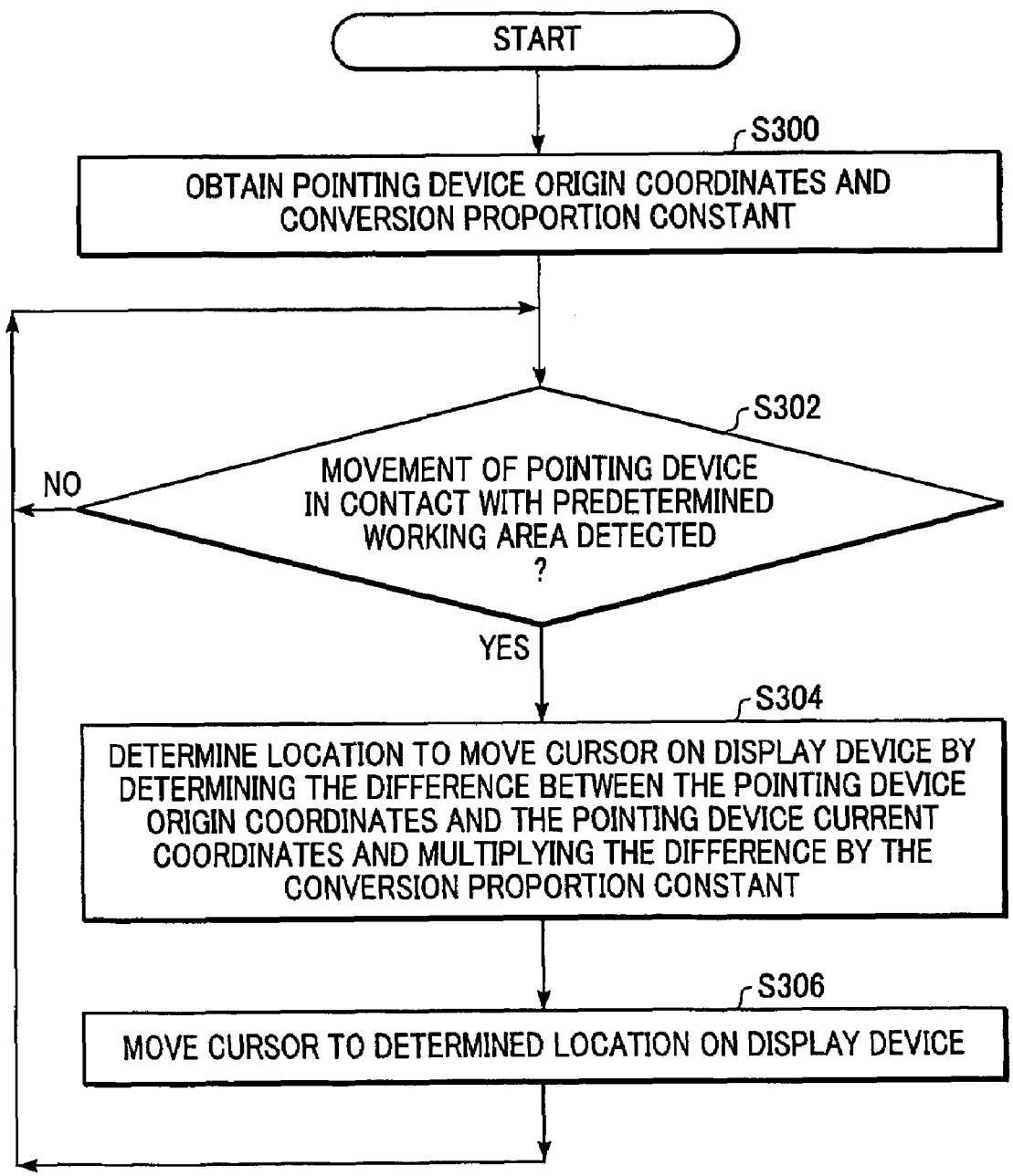

FIG. 5 is a flow chart illustrating exemplary logic for moving a cursor 101 based on the operation of a touch pad 150 according to the second embodiment. The exemplary logic may be implemented in program code (software) that is executed by a computer, such as PC 102, in order to detect the operation of the touchpad and display a cursor 101 on a display device, such as monitor 100.

In step S300, pointing device origin coordinates (e.g., $\vec{a_{20}}$ in FIG. 4) and a conversion proportion constant ($k_2$) are obtained.

A user places a pointing device, such as a stylus 103 in contact with a predetermined working area 150. The user moves the pointing device 103 while it is in contact with the working area 150. Such movement of the pointing device 103 while in contact with the predetermined working area 150 is detected in step S302. If detection of movement of the pointing device 103 while in contact with the predetermined working area 150 is not determined in step S302, the logic of step S302 is repeated until such detection occurs.

After detection of movement of the pointing device 103 while in contact with the working area 150 (step S302), a cursor location is determined in step S304. The difference between the pointing device origin coordinates (obtained in step S300) and the current pointing device coordinates (obtained in step S302 when movement of the pointing device 103 is detected) is computed. The difference is then multiplied by the conversion proportion constant ($k_2$) obtained in step S300 in order to determine the cursor location. Next, in step S306, the cursor 101 is moved to the display device location determined in step S306. The logic then returns to step S302.

As described above, according to the second embodiment, the cursor can be moved in accordance with the shift of the stylus pen 103, i.e., the absolute coordinates of the stylus pen 103, while the stylus pen 103 is kept in contact with the surface of the touch pad. Consequently, the movement of the stylus pen 103 on the working area 150 can be reduced in the same manner as the first embodiment, and the cursor can be moved even more freely.

Third Embodiment

A third embodiment is described below.

In the method for controlling the cursor according to the third embodiment, a vector $\vec{a_{31}}$, represents the shift of the stylus pen 103 in the moving mode on the working area 150 of the touch pad (PDA 104). When the stylus pen 103 is in a stop mode, i.e., when the stylus pen 103 is not moved but is kept in contact with the working area 150 of the touch pad at a position $\vec{a_{32}}$, the magnitude of the vector $\vec{a_{32}}$ equals zero ($\vec{a_{32}} = 0$). Vectors $\vec{a_{33}}, \vec{a_{34}}, \ldots,$ and $\vec{a_{3n}}$ represent the subsequent movement of the stylus pen 103.

In the third embodiment, each of the vectors $\vec{a_{31}}, \vec{a_{32}}$, $a_{33}, \ldots,$ and $\vec{a_{3n}}$ of the shift of the stylus pen 103 on the working area 150 correspond to vectors $\vec{b_{31}}, \vec{b_{32}}, \vec{b_{33}}, \ldots,$ and $\vec{b_{3n}}$ of the cursor 101, respectively. In this embodiment, the vectors are controlled so that they satisfy the formulas below:

$$\vec{b_{31}} = k_3 * \vec{a_{31}}$$

$$\vec{b_{32}} = k_3 * \vec{a_{31}}$$

$$\vec{b_{33}} = k_3 * (\vec{a_{31}} + \vec{a_{33}})$$

$$\vec{b_{34}} = k_3 * (\vec{a_{31}} + \vec{a_{34}})$$

...

...

...

$$\vec{b_{3n}} = k_3 * (\vec{a_{31}} + \vec{a_{3n}})$$

(where, $k_3$ is a constant)

When the stylus pen 103 loses contact with the surface of the working area 150 and then restores its contact with the surface of the working area 150, the cursor 101 moves so that the vector $\vec{b_{3n}}$ of the shift of the cursor 101 satisfies the formula below:

$$\vec{b_{3n}} = k_3 * \vec{a_{3n}}.$$

According to the third embodiment, when the stylus pen 103, which was in the moving mode, is switched to the stop mode and then switched back to the moving mode, the cursor moves in accordance with a predetermined proportion (which in this case is $k_3 * \vec{a_{31}}$) of the vector of the shift of the stylus pen 103 immediately before the stylus pen 103 is switched to the stop mode.

If the stylus pen 103 loses contact with the surface of the working area 150 and then restores its contact with the surface of the working area 150, the vector $\vec{b_{3n}}$ of the shift of the cursor 101 satisfies the formula below:

$$\vec{b_{3n}} = k_3 * \vec{a_{3n}}.$$

In other words, the shift of the cursor 101 is unaffected by the vector of the shift of the stylus pen 103 immediately before the stylus pen 103 is switched to the stop mode.

Figure 6:
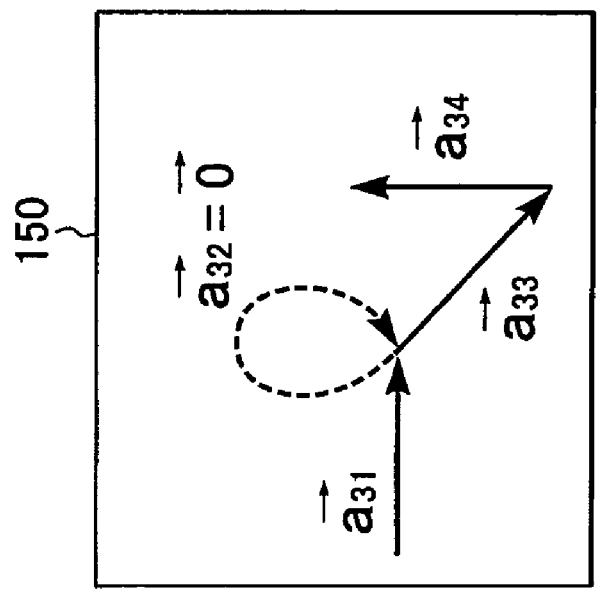

FIG. 6 illustrates the shift of the stylus pen 103 on the working area 150 of the PDA 104 according to the third embodiment and the corresponding movement of the cursor 101 controlled in accordance with the movement of the stylus pen 103 in the moving mode and the stop mode. In FIG. 6, the dotted arrow in the working area 150 indicates that the stylus pen 103 is in the stop mode. According to FIG. 6, as described in the first embodiment, even when the stylus pen 103 is in the stop mode, as long as the stylus pen 103 is in contact with the surface of the working area 150, the cursor 101 continues to move according to the vector of the shift of the stylus pen 103 immediately before the stylus pen 103 is switched to the stop mode. Then, the stylus pen 103 is switched back to the moving mode. The shift of the cursor 101 is obtained from the sum of the vector of the shift after the stylus pen 103 is switched back to the moving mode and the vector of the shift of the stylus pen 103 immediately before the stylus pen 103 is switched to the stop mode. In this way, the cursor 101 can be finely controlled.

By changing the constant $k_3$, the input of the stylus pen 103 on the working area 150 can be converted into the movement of the cursor in different proportions.

Figure 7:
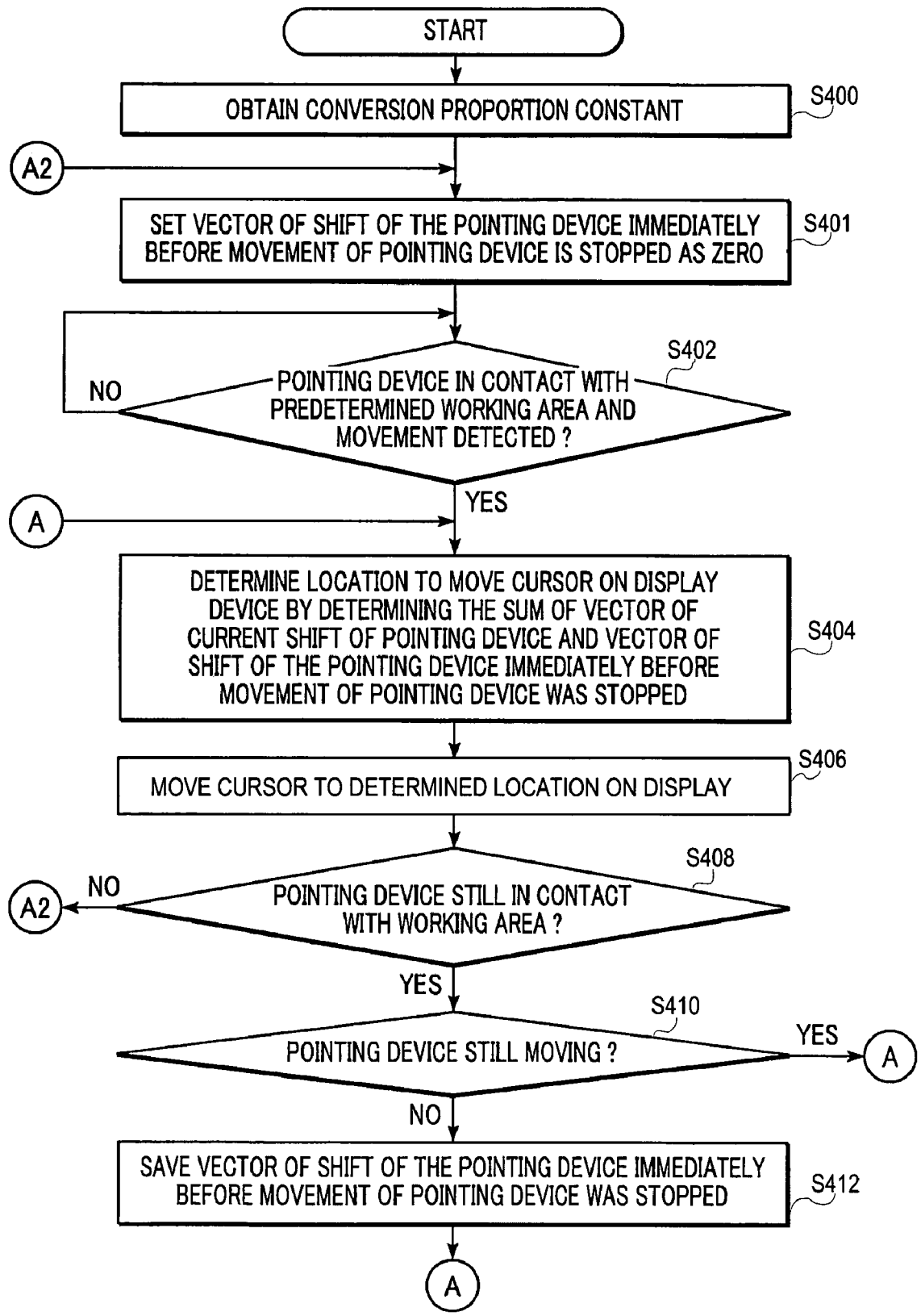

FIG. 7 is a flow chart illustrating exemplary logic for moving a cursor 101 based on the operation of a touch pad 150 according to the third embodiment. The exemplary logic may be implemented in program code (software) that is executed by a computer, such as PC 102, in order to detect the operation of the touchpad and display a cursor 101 on a display device, such as monitor 100.

In step S400, a conversion proportion constant ($k_3$) is obtained. The vector of shift of the pointing device immediately before movement of the pointing device is stopped is set to zero in step S401.

A user places a pointing device, such as a stylus 103 in contact with a predetermined working area 150. The user moves the pointing device 103 while it is in contact with the working area 150. Such movement of the pointing device 103 while in contact with the predetermined working area 150 is detected in step S402. If detection of movement of the pointing device 103 while in contact with the predetermined working area 150 is not determined in step S402, the logic of step S402 is repeated until such detection occurs.

After detection of movement of the pointing device 103 while in contact with the working area 150 (step S402), a cursor location is determined in step S404. The location to move the cursor 101 on the display device 100 is determined by determining the sum of the vector of the current shift of the pointing device and the vector of the shift of the pointing device immediately before movement of the pointing device was stopped. The difference is then multiplied by the conversion proportion constant ($k_3$) obtained in step S400. Next, in step S406, the cursor 101 is moved to the determined location on the display device 100. The logic then moves to step S408 to determine if the pointing device 103 is still in contact with the working area 150.

If the pointing device 103 is not still in contact with the predetermined working area 150, the logic returns to step S401. If the pointing device 103 is still in contact with the predetermined working area 150, the logic proceeds to step S410 to determine if the pointing device 103 is still moving. If the pointing device 103 is still moving, the logic returns to step S404. If the pointing device 103 is in the stop mode (in contact with the predetermined working area 150 but not moving), the logic proceeds to step S412 where the vector shift of the pointing device 103 immediately before movement of the pointing device 103 stopped is saved. The logic then returns to step S404 to determine the location to move the cursor 101 on the display device 100.

As described above, according to the third embodiment, even after the stylus pen 103 is switched back to the moving mode from the stop mode, the shift of the cursor 101 is affected by the vector of the shift of the stylus pen 103 immediately before the stylus pen 103 is switched to the stop mode. Moreover, the movement of the cursor 101 can be finely controlled.

Fourth Embodiment

A fourth embodiment is described below.

In the method for controlling the cursor according to the fourth embodiment, a vector $\vec{a_{41}}$ represents the shift of the stylus pen 103 in the moving mode on the working area 150 of the touch pad (PDA 104). When the stylus pen 103 is in a stop mode, i.e., when the stylus pen 103 is not moved but is kept in contact with the working area 150 of the touch pad at a position $\vec{a_{42}}$, the magnitude of the vector $\vec{a_{42}}$ equals zero ($\vec{a_{42}}=0$). Vectors $\vec{a_{43}}$, $\vec{a_{44}}$, . . . , and $\vec{a_{4n}}$ represent the subsequent movement of the stylus pen 103.

In the fourth embodiment, each of the vectors $\vec{a_{41}}$, $\vec{a_{42}}$, $\vec{a_{43}}$, . . . , and $\vec{a_{4n}}$ of the shift of the stylus pen 103 on the working area 150 correspond to vectors $\vec{b_{41}}$, $\vec{b_{42}}$, $\vec{b_{43}}$ . . . , and $\vec{b_{4n}}$ of the cursor 101, respectively. In this embodiment, the vectors are controlled so that they satisfy the formulas below:

$$\vec{b_{41}} = k_4 * \vec{a_{41}}$$

$$\vec{b_{42}} = k_4 * \vec{a_{41}}$$

$$\vec{b_{43}} = k_4 * (\vec{a_{41}} + \vec{a_{43}})$$

$$\vec{b_{44}} = k_4 * (\vec{a_{41}} + \vec{a_{43}})$$

...

...

...

$$\vec{b_{4n}} = k_4 * (\vec{a_{41}} + \vec{a_{4n}})$$

(where, $k_4$ is a constant).

The control of the cursor 101 described above is the same as the control according to the third embodiment. For the fourth embodiment, however, the vector $\vec{b_{4n}}$ of the shift of the cursor is defined as the formula below only when one of the three conditions described below is satisfied:

$$\vec{b_{4n}} = k_4 * \vec{a_{4n}}.$$

In other words, the shift of the cursor 101 is unaffected by the vector $\vec{a_{41}}$ of the shift of the stylus pen 103 immediately before the stylus pen 103 is switched to the stop mode but only affected by the vector $\vec{a_{4n}}$ of the current shift of the stylus pen 103. More specifically, the cursor is controlled in a relative movement mode in which the shift of the cursor 101 is controlled only by the current shift of the stylus pen 103.

Condition 1

The vector of the shift of the stylus pen 103 on the working area 150 is defined by the formula below:

$$\vec{a_{41}} = (\vec{a_{41x}}, \vec{a_{41y}}).$$

Moreover, the vector of the shift of the stylus pen 103 immediately before the stylus pen 103 is switched to the stop mode is defined by the formula below:

$$\vec{a_{4n}} = (\vec{a_{4nx}}, \vec{a_{4ny}}).$$

Here, the conditional expression presented below is obtained, where $K_{41}$ and $K_{42}$ are positive constants:

$$[(\vec{a_{41x}} * \vec{a_{4nx}} \leq 0)$$

and $$(K_{41} * |\vec{a_{41x}}| < |\vec{a_{4nx}}|)]$$

and $$[(\vec{a_{41y}} * \vec{a_{4ny}} \leq 0)$$

and $$(K_{42} * |\vec{a_{41y}}| < |\vec{a_{4ny}}|)].$$

More specifically, according to Condition 1, the cursor 101 is switched to the relative movement mode when the x coordinates and y coordinates of the vector $\vec{a_{41}}$ of the shift of the stylus pen 103 immediately before the stylus pen 103 is switched to the stop mode and the vector $\vec{a_{4n}}$ of the current shift of the stylus pen 103 have opposite values and the magnitude of the vector $\vec{a_{4n}}$ is a predetermined multiple of the vector $\vec{a_{41}}$.

Condition 2

Similar to Condition 1, the vectors of the shift of the stylus pen 103 immediately before the stylus pen 103 is switched to the stop mode and the shift of the stylus pen 103 after the stylus pen 103 was switched to the stop mode are defined as the formulas below:

$$\vec{a_{41}} = (\vec{a_{41x}}, \vec{a_{41y}})$$

$$\vec{a_{4n}} = (\vec{a_{4nx}}, \vec{a_{4ny}}).$$

Here, the conditional expression presented below is obtained, where $K_{41}$ and $K_{42}$ are positive constants:

$$[(\vec{a_{41x}} * \vec{a_{4nx}} \leq 0)$$

and $$(K_{41} * |\vec{a_{41x}}| < |\vec{a_{4nx}}|)]$$

or $$[(\vec{a_{41y}} * \vec{a_{4ny}} \leq 0)$$

and $$(K_{42} * |\vec{a_{41y}}| < |\vec{a_{4ny}}|)]$$

More specifically, according to Condition 2, the cursor 101 is switched to the relative movement mode when at least one of the x coordinates and the y coordinates of the vector $\vec{a_{41}}$ of the shift of the stylus pen 103 immediately before the stylus pen 103 is switched to the stop mode and the vector $\vec{a_{4n}}$ of the current shift of the stylus pen 103 have opposite values and the magnitude of the vector $\vec{a_{4n}}$ is a predetermined multiple of the vector $\vec{a_{41}}$.

Condition 3

Similar to Condition 1, the vector $\vec{a_{41}}$ of the shift of the stylus pen 103 immediately before the stylus pen 103 is switched to the stop mode and the vector $\vec{a_{4n}}$ of the shift of the stylus pen 103 after the stylus pen 103 was switched to the stop mode are defined as the formulas below:

$$\vec{a_{41}} = (\vec{a_{41x}}, \vec{a_{41y}})$$

$$\vec{a_{4n}} = (\vec{a_{4nx}}, \vec{a_{4ny}}).$$

According to the comparative results of $|\vec{a_{41x}}|$ and $|\vec{a_{41y}}|$, $\vec{b_{4z}}$ is defined as the formulas below:

$$\vec{b_{4z}} = (\vec{b_{4zx}}, \vec{b_{4zy}}) = (\vec{a_{41x}}, 0),$$

when $$|\vec{a_{41x}}| \geq |\vec{a_{41y}}|$$

$$\vec{b_{4z}} = (\vec{b_{4zx}}, \vec{b_{4zy}}) = (0, \vec{a_{41x}}),$$

when $$|\vec{a_{41x}}| < |\vec{a_{41y}}|.$$

Here, the conditional expression presented below is obtained, where $K_{41}$ and $K_{42}$ are positive constants:

$$[(\vec{b_{4zx}} * \vec{a_{4nx}} \leq 0)$$

and $$(K_{41} * |\vec{b_{4zx}}| < |\vec{a_{4nx}}|)]$$

and $$[(\vec{b_{4zy}} * \vec{a_{4ny}} \leq 0)$$

and $$(K_{42} * |\vec{b_{4zy}}| < |\vec{a_{4ny}}|)].$$

According to Condition 3, the x coordinate or the y coordinate of the vectors of the shift of the stylus pen 103 immediately before the stylus pen 103 is switched to the stop mode having the larger absolute value is subjected to Condition 1. In other words, the cursor 101 is switched to the relative movement mode when the x coordinates and the y coordinates of the vector $\vec{a_{41}}$ of the shift of the stylus pen 103 immediately before the stylus pen 103 is switched to the stop mode and when the vector $\vec{a_{4n}}$ is shifted even slightly.

Figure 8:
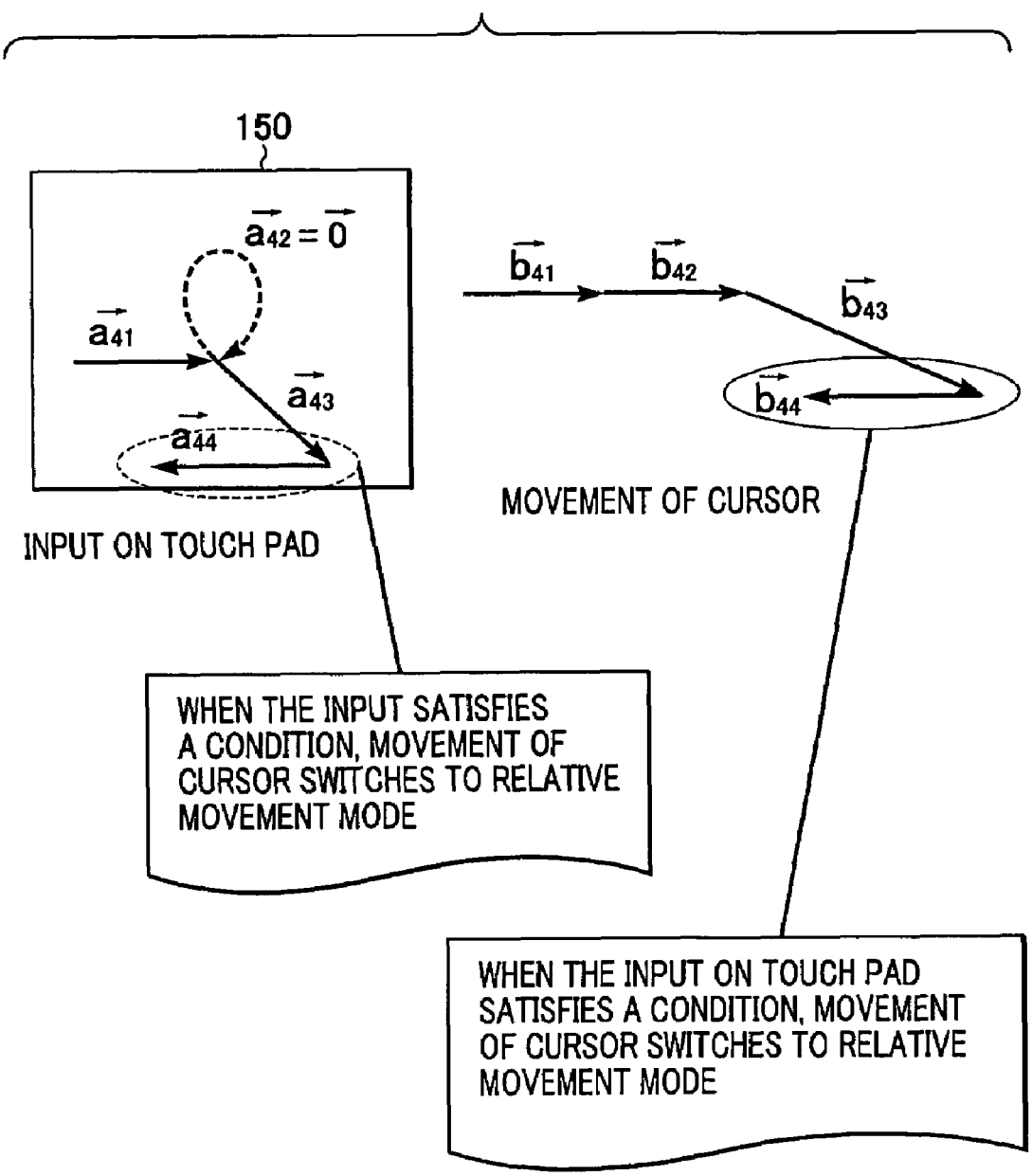

FIG. 8 illustrates the shift of the stylus pen 103 on the working area 150 of the PDA 104 according to the fourth embodiment and the corresponding movement of the cursor 101 controlled in accordance with the movement of the stylus pen 103 in the moving mode and the stop mode. In FIG. 8, the dotted arrow in the working area 150 indicates that the stylus pen 103 is in the stop mode. FIG. 8 illustrates the vectors $\vec{a_{41}}$ to $\vec{a_{43}}$ of the shift of the stylus pen 103 on the working area 150. The drawing shows how the cursor 101 is finely controlled in the same manner as illustrated in FIG. 6 described in the third embodiment. The cursor 101 is switched to the relative movement mode as shown by the vectors $\vec{a_{44}}$ and $\vec{b_{44}}$ when one of the three above-mentioned, predetermined conditions is satisfied.

By changing the constant $k_4$, the input of the stylus pen 103 on the working area 150 can be converted into the movement of the cursor in different proportions. By changing the constants $K_{41}$ and $K_{42}$, the conditions for switching the control of the cursor 101 can be changed.

Figure 9:
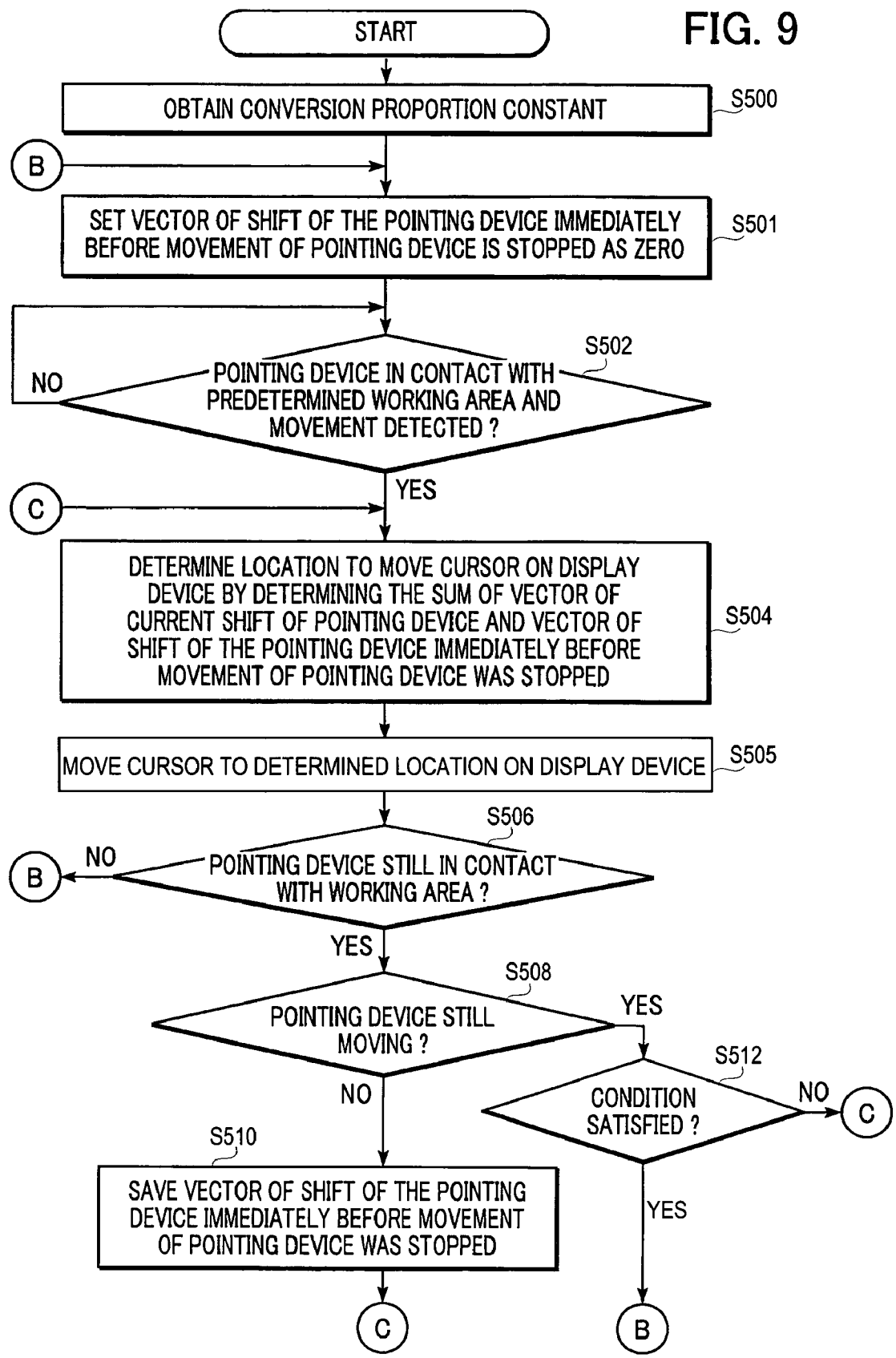

FIG. 9 is a flow chart illustrating exemplary logic for moving a cursor 101 based on the operation of a touch pad 150 according to the fourth embodiment. The exemplary logic may be implemented in program code (software) that is executed by a computer, such as PC 102, in order to detect the operation of the touchpad and display a cursor 101 on a display device, such as monitor 100.

In step S500, conversion proportion constants ($k_4$, $K_{41}$ and $K_{42}$) are obtained. In Step S501, the vector of shift of the pointing device immediately before movement of the pointing device stopped is set to zero.

A user places a pointing device, such as a stylus 103 in contact with a predetermined working area 150. The user moves the pointing device 103 while it is in contact with the working area 150. Such movement of the pointing device 103 while in contact with the predetermined working area 150 is detected in step S502. If detection of movement of the pointing device 103 while in contact with the predetermined working area 150 is not determined in step S502, the logic of step S502 is repeated until such detection occurs.

After detection of movement of the pointing device 103 while in contact with the working area 150 (step S502), the logic proceeds to step S504 where the location to move the cursor 101 on the display device 100 is determined. The cursor location as a reflection of the pointing device 103 is determined by determining the sum of the vector of the shift of the pointing device and the vector of the shift of the pointing device immediately before movement of the pointing device was stopped. The sum is multiplied by a conversion proportion constant ($k_4$). The cursor 101 is moved to the determined location on the display device 100 in step S505.

The logic then proceeds to step S506 to determine if the pointing device 103 is still in contact with the working area 150. If the pointing device 103 is not still in contact with the predetermined working area 150, the logic returns to step S501. If the pointing device 103 is still in contact with the working area 150, the logic proceeds to step S508 to determine if the pointing device 103 is still moving.

If the pointing device 103 is in the stop mode (in contact with the working surface 150, but not moving), the logic proceeds from step S508 to step S510 where the vector shift of the pointing device 103 immediately before movement of the pointing device 103 stopped is saved. The logic then returns to step S504 to determine the location to move the cursor 101 on the display device 100.

If the pointing device 103 is still moving (yes in step S508), the logic proceeds to step S512 to determine if a predefined condition has been satisfied. In the exemplary embodiment described above, there are three conditions and any one of the three predefined conditions may be satisfied. In the exemplary embodiment described above, the conditions used to determine whether the cursor mode is switched to relative mode are based on the values and magnitude of the current shift compared with the values and magnitude of the vector of the shift of the pointing device 103 immediately before the pointing device was switched to the stop mode. Vector multiple constants $K_{41}$ and $K_{42}$ (obtained in step S500) are used in these comparisons. If any of the predefined conditions are satisfied (yes in step S512), the logic returns to step S501. However, if none of the predefined conditions are satisfied, the cursor is displayed in a relative mode. In order to display the cursor in the relative mode, the logic returns to step S504 where a cursor display location is determined by determining the sum of the vector of the current shift of the pointing device and the vector of the shift of the pointing device immediately before movement of the pointing device was stopped and multiplying the sum by a conversion proportion constant ($k_4$).

As described above, according to the fourth embodiment, the movement of the cursor 101 can be appropriately switched between the mode in which the vector of the shift of the stylus pen 103 immediately before the stylus pen 103 is switched to the stop mode affects the movement of the cursor 101 and the mode in which the vector of the shift of the stylus pen 103 immediately before the stylus pen 103 is switched to the stop mode, while maintaining the contact between the stylus pen 103 and the working area 150.

Fifth Embodiment

A fifth embodiment is described below. The structure of the system and the basic operation are the same as the first embodiment described above.

FIG. 10 illustrates the shift of the stylus pen 103 on the working area 150 of the PDA 104 according to this embodiment and the corresponding movement of the cursor 101 controlled in accordance with the movement of the stylus pen 103 in the moving mode and the stop mode. In FIG. 10, the PC 102 includes a display area 205 that is the area the cursor 101 can move on the display. The coordinates of a vector inside the display area 205 are ($x_{52}$, $Y_{52}$). The working area 150 on the PDA 104 includes an effective region 201 that corresponds to the above-mentioned display area 205. The coordinates of a vector inside the effective region 201 are ($x_{51}$, $Y_{51}$). The area of the working area 150 excluding the effective region 201 is an ineffective region 202.

When the cursor 101 is operated by input to the PDA 104, the upper left corner of the effective region 201 on the working area 150 is set as an origin. The absolute coordinates $\vec{a_{51}}$, $\vec{a_{52}}$, ..., and $\vec{a_{5n}}$ indicate the positions the stylus pen 103 contacts, wherein $\vec{a_{5n}}$ can be expressed as ($\vec{a_{5nx}}$, $\vec{a_{5ny}}$) (or $\vec{a_{5n}}=(\vec{a_{5nx}}, \vec{a_{5ny}})$). The absolute coordinates $\vec{b_{51}}$, $\vec{b_{52}}$, ..., and $\vec{b_{5n}}$ indicate the positions of the cursor 101 corresponding to the above-mentioned absolute coordinates $\vec{a_{51}}$, $\vec{a_{52}}$, ..., and $\vec{a_{5n}}$, of the stylus pen 103, wherein $\vec{b_{5n}}$ can be expressed as ($\vec{b_{5nx}}$, $\vec{b_{5ny}}$) (or $\vec{b_{5n}}=(\vec{b_{5nx}}, \vec{b_{5ny}})$).

In the fifth embodiment, each of the vectors $\vec{a_{51}}$, $\vec{a_{52}}$, ..., and $\vec{a_{5n}}$ of the shift of the stylus pen 103 on the working area 150 correspond to vectors $\vec{c_{51}}$, $\vec{c_{52}}$, ..., and $\vec{c_{5n}}$ of the cursor 101, respectively. In this embodiment, the vectors are controlled so that they satisfy the formulas below. In other words, when the stylus pen 103 contacts, for example, the position $\vec{a_{51}}$, the cursor located at the position $\vec{b_{51}}$ moves according to the vector $\vec{c_{51}}$.

$$\vec{c_{51x}} = k_{5x} * ((x_{52}/x_{51}) * (\vec{a_{51x}} - \vec{b_{51x}}))$$

$$\vec{c_{51y}} = k_{5y} * ((y_{52}/y_{51}) * (\vec{a_{51y}} - \vec{b_{51y}}))$$

$$\vec{c_{52x}} = k_{5x} * ((x_{52}/x_{51}) * (\vec{a_{52x}} - \vec{b_{52x}}))$$

$$\vec{c_{52y}} = k_{5y} * ((y_{52}/y_{51}) * (\vec{a_{52y}} - \vec{b_{52y}}))$$

...

...

...

$$\vec{c_{5nx}} = k_{5x} * ((x_{52}/x_{51}) * (\vec{a_{5nx}} - \vec{b_{5nx}}))$$

$$\vec{c_{5ny}} = k_{5y} * ((y_{52}/y_{51}) * (\vec{a_{5ny}} - \vec{b_{5ny}})).$$

Here, constants $k_{5x}$ and $k_{5y}$ are less than or equal to one (1), where $\vec{c_{5n}} = (\vec{c_{5x}}, \vec{c_{5y}})$.

The movement control of the cursor 101 according to the fifth embodiment is shown in FIG. 10. The dotted line and the solid line in FIG. 6 are vectors indicating the absolute coordinates of the stylus pen 103. In actuality, the stylus pen 103 contacts only the positions $\vec{a_{51}}$ and $\vec{a_{52}}$.

According to FIG. 10, the cursor 101 is moved from its current position $\vec{b_{5n}}$ according to the difference with the absolute coordinates $\vec{a_{5n}}$ input by the stylus pen 103 on the PDA 104. The cursor 101, however, is actually moved from the current position $\vec{b_{5n}}$ along the vector $\vec{c_{5n}}$, which is determined by taking into consideration the size ratio of the display area 205 of the PC 102 and the effective region 201 of the working area 150 of PDA 104. For example, when the stylus pen 103 comes in contact with the position $\vec{a_{51}}$, the cursor 101 at the position $\vec{b_{51}}$ moves along the vector $\vec{c_{51}}$ and reaches the position $\vec{b_{52}}$. Then, when the stylus pen 103 comes in contact with the position $\vec{a_{52}}$, the cursor 101 at the position $\vec{b_{52}}$ moves along the vector $\vec{c_{52}}$. In this way, when moving the cursor 101 a long distance, the movement of the stylus pen 103 can be reduced. When moving the cursor 101 a short distance, the cursor 101 can be moved so that the relative position of the point of the stylus pen 103 contacts on the effective region 201 and the relative position of the position of the cursor 101 on the display area 205 are substantially equal. In FIG. 10, as it is apparent from the position $\vec{a_{52}}$ that is on the ineffective region 202 of the working area 150, even if the stylus pen 103 contacts a point on the ineffective region 202, the cursor 101 can be effectively moved on the display area 205.

By changing the constants $k_{5x}$ and $k_{5y}$, the input of the stylus pen 103 on the working area 150 can be converted into the movement of the cursor in different proportions.

FIG. 11 is a flow chart illustrating exemplary logic for moving a cursor 101 based on the operation of a touch pad 150 according to the fifth embodiment. The exemplary logic may be implemented in program code (software) that is executed by a computer, such as PC 102, in order to detect the operation of the touchpad and display a cursor 101 on a display device, such as monitor 100.

In step S600, pointing device coordinates for an effective region of the touchpad and conversion proportion constants ($k_{5x}$ and $k_{5y}$) are obtained. In step S602, the upper left coordinates of the effective region of the touchpad (obtained in step S600) are set as the pointing device origin.

A user places a pointing device, such as a stylus 103 in contact with a predetermined working area 150. The user moves the pointing device 103 while it is in contact with the working area 150. Such movement of the pointing device 103 while in contact with the predetermined working area 150 is detected in step S604. The detection determination step (step (S604)) is repeated until movement of the pointing device 103 while in contact with the working area 150 is detected.

After detection of movement of the pointing device 103 while in contact with the working area 150 (step S604), the logic proceeds to step S606 where a starting cursor display location is determined. Next, in step S608, a cursor display vector is determined by taking into consideration the conversion proportion constants ($k_{5x}$ and $k_{5y}$) and the size ratio of the display area of the display device and the effective region of the touchpad (obtained in step S600). In step S610, the cursor is moved from the starting display location (determined in step S606) along the vector computed in step S608. The logic then returns to step S604.

As described above, according to the fifth embodiment, the effective region 201 on the working area 150 can be effectively used and the movement of the stylus pen 103 can be reduced for moving the cursor 101 a long distance. Consequently, the operation of the touch pad improves.

Other Embodiments

The present invention may be applied to a system comprising a plurality of apparatuses (for example, a host computer, an interface device, a reader, and a printer) or an apparatus comprising a single device (for example, a copy machine, or a facsimile machine). A storage medium with program code (software) for performing the functions according to the above-described embodiments may be supplied. The program code stored in the storage medium can be read and executed by the computer (central processing unit (CPU) or microprocessing unit (MPU)) in the system or the apparatus.

In this case, the program code read from the storage medium performs the functions according to the above-described embodiments.

The storage medium for supplying the program code may be, for example, a floppy disk, a hard disk, an optic disk, a magnetic optical disk, a compact disc read-only memory (CD-ROM), a compact disc rewriteable (CD-R), a magnetic tape, a non-volatile memory card, or a read-only memory (ROM).

By executing the program code read by the computer, the functions of the above-described embodiments are performed. Moreover, a part of the processing for performing the functions of the above-described embodiments are carried out by an operating system (OS) of the computer based on the commands of the program code.

After the program code read from the storage medium and written into a memory, including in a function extension board installed on the computer or a function extension unit connected to the computer, the CPU or MPU included in the function extension board or the function extension unit carries out the actual processing.

As described above, according to these embodiments, the movement of the cursor can be reduced for specifying coordinates of the cursor by providing input on the working area.

Moreover, the control method of the cursor can be switched based on the input on the working area.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for controlling a cursor on a display device, the method comprising:

operating a pointing device on a predetermined working area, the pointing device being in contact with the working area, movement of the pointing device in contact with the working area causing a vector to be generated; and moving the cursor on the display device in response to the operating of the pointing device on the predetermined working area, wherein the moving of the cursor reflects a predetermined proportion of the vector of a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that the coordinates of the vector of the current shift of the pointing device immediately before the pointing device is stopped and in contact with the working area and the current vector of the pointing device have opposite values and the magnitude of the current vector is a predetermined multiple of the vector of the prior shift of the pointing device immediately before the pointing device is stopped and in contact with the working area.

2. A method for controlling a cursor on a display device, the method comprising:

operating a pointing device on a predetermined working area, the pointing device being in contact with the working area, movement of the pointing device in contact with the working area causing a vector to be generated; and moving the cursor on the display device in response to the operating of the pointing device on the predetermined working area, wherein the moving of the cursor reflects a predetermined proportion of the vector of a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that at least one of the coordinates of the vector of the current shift of the pointing device immediately before the pointing device is stopped and in contact with the working area and the current vector of the pointing device have opposite values and magnitude of the current vector is a predetermined multiple of the vector of the shift of the pointing device immediately before the pointing device is stopped and in contact with the working area.

3. A method for controlling a cursor on a display device, the method comprising:

operating a pointing device on a predetermined working area, the pointing device being in contact with the working area, movement of the pointing device in contact with the working area causing a vector to be generated; and moving the cursor on the display device in response to the operating of the pointing device on the predetermined working area, wherein the moving of the cursor reflects a predetermined proportion of the vector of a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that the coordinates of the vector of the current shift of the pointing device immediately before the pointing device is stopped and in contact with the working area and one of the coordinates of the current vector of the pointing device having the larger magnitude have opposite values, and the magnitude of the current vector is a predetermined multiple of the vector of the prior shift of the pointing device immediately before the pointing device is stopped and in contact with the working area.

4. The method for controlling a cursor on a display device of claim 1, wherein reflection of the vector of the shift of the pointing device is continued while the pointing device is stopped and in contact with the working area.

5. The method for controlling a cursor on a display device of claim 4, wherein the vector is not reflected in the movement of the cursor after the pointing device loses contact with the working area.

6. The method for controlling a cursor on a display device of claim 2, wherein reflection of the vector of the shift of the pointing device is continued while the pointing device is stopped and in contact with the working area.

7. The method for controlling a cursor on a display device of claim 6, wherein the vector is not reflected in the movement of the cursor after the pointing device loses contact with the working area.

8. The method for controlling a cursor on a display device of claim 3, wherein reflection of the vector of the shift of the pointing device is continued while the pointing device is stopped and in contact with the working area.

9. The method for controlling a cursor on a display device of claim 8, wherein the vector is not reflected in the movement of the cursor after the pointing device loses contact with the working area.

10. A cursor controlling system for use in an operating environment that includes a pointing device, a predetermined working area, and a display device, the display device displaying a cursor responsive to operation of the pointing device, the cursor controlling system comprising:

a vector generator that, in response to movement of the pointing device both along and in contact with the predetermined working area, generates a vector reflecting the movement; and a cursor controller that moves the cursor responsive to a predetermined proportion of the vector reflecting a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that the coordinates of the vector of the current shift of the pointing device immediately before the pointing device is stopped and in contact with the working area and the current vector of the pointing device have opposite values and the magnitude of the current vector is a predetermined multiple of the vector of the prior shift of the pointing device immediately before the pointing device is stopped and in contact with the working area.

11. A cursor controlling system for use in an operating environment that includes a pointing device, a predetermined working area, and a display device, the display device displaying a cursor responsive to operation of the pointing device, the cursor controlling system comprising:

a vector generator that, in response to movement of the pointing device both along and in contact with the predetermined working area, generates a vector reflecting the movement; and a cursor controller that moves the cursor responsive to a predetermined proportion of the vector reflecting a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that at least one of the coordinates of the vector of the current shift of the pointing device immediately before the pointing device is stopped and in contact with the working area and the current vector of the pointing device have opposite values and magnitude of the current vector is a predetermined multiple of the vector of the shift of the pointing device immediately before the pointing device is stopped and in contact with the working area.

12. A cursor controlling system for use in an operating environment that includes a pointing device, a predetermined working area, and a display device, the display device displaying a cursor responsive to operation of the pointing device, the cursor controlling system comprising:

a vector generator that, in response to movement of the pointing device both along and in contact with the predetermined working area, generates a vector reflecting the movement; and a cursor controller that moves the cursor responsive to a predetermined proportion of the vector reflecting a shift of the pointing device immediately before movement of the pointing device is stopped, wherein when the pointing device is further shifted and in contact with the working area in a predetermined direction, the cursor is moved without reflection of the vector of the prior movement of the pointing device if the current movement of the pointing device satisfies a predetermined condition, and wherein the predetermined condition is that the coordinates of the vector of the current shift of the pointing device immediately before the pointing device is stopped and in contact with the working area and one of the coordinates of the current vector of the pointing device having the larger magnitude have opposite values, and the magnitude of the current vector is a predetermined multiple of the vector of the prior shift of the pointing device immediately before the pointing device is stopped and in contact with the working area.

* * * * *